United States Patent
Kojima et al.

(10) Patent No.: US 7,630,581 B2
(45) Date of Patent: Dec. 8, 2009

(54) CORRECTING IMAGE DISTORTION CAUSED BY SCANNING

(75) Inventors: Keiji Kojima, Kanagawa-ken (JP);
Tadashi Araki, Kanagawa-ken (JP);
Maki Shinoda, Tokyo-to (JP)

(73) Assignee: Ricoh Company, Ltd., Tokyo (JP)

( * ) Notice: Subject to any disclaimer, the term of this patent is extended or adjusted under 35 U.S.C. 154(b) by 813 days.

(21) Appl. No.: 11/168,761

(22) Filed: Jun. 29, 2005

(65) Prior Publication Data
US 2008/0137987 A1   Jun. 12, 2008

(30) Foreign Application Priority Data
Jun. 30, 2004   (JP)   ............... 2004-193777

(51) Int. Cl.
*G06K 9/36*   (2006.01)
(52) U.S. Cl. ..................................... 382/290
(58) Field of Classification Search ............ 382/290
See application file for complete search history.

(56) References Cited

U.S. PATENT DOCUMENTS 6,141,443 A * 10/2000 Nakao et al. .............. 382/174
6,330,050 B1 * 12/2001 Takahashi et al. ............ 355/25
6,577,763 B2 * 6/2003 Fujimoto et al. ............ 382/199
7,035,463 B1 * 4/2006 Monobe et al. ............. 382/177

FOREIGN PATENT DOCUMENTS

| EP | 702320 A1 | * | 3/1996 |
|---|---|---|---|
| EP | 1215881 A1 | * | 6/2002 |
| JP | 10254994 A | * | 9/1998 |
| JP | 3175250 | | 4/2001 |
| JP | 2003-198845 | | 7/2003 |
| JP | 3532385 | | 3/2004 |
| JP | 2004129189 A | * | 4/2004 |

* cited by examiner

*Primary Examiner*—Vikkram Bali
*Assistant Examiner*—Soo Jin Park
(74) *Attorney, Agent, or Firm*—Dickstein Shapiro LLP

(57) ABSTRACT

An apparatus, system, method, computer program and product are disclosed, each capable of correcting distortion in a scanned image, using at least a character line extracted from the scanned image. To extract the character line, a circumscribed rectangle is formed for each character, having a length determined based on an average character size of the scanned image.

26 Claims, 12 Drawing Sheets

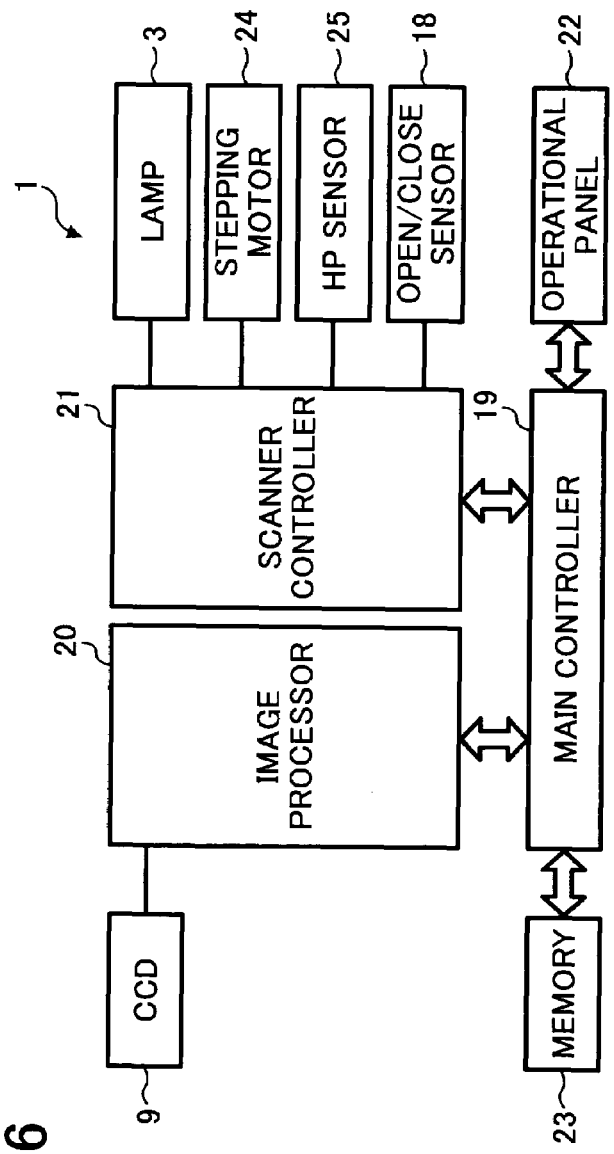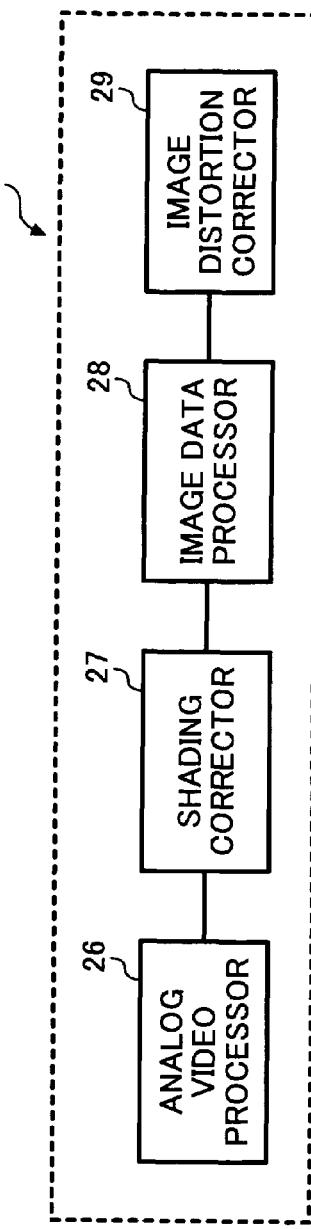
FIG. 6
FIG. 7

START → S41 EXTRACTING PAGE OUTLINE → S42 EXTRACTING RULE LINE → S43 EXTRACTING CHARACTER LINE → END ent model cases. The error can be expressed
For the weighted error only two addition

41 →

A1

41 →

CORRECTING IMAGE DISTORTION CAUSED BY SCANNING

CROSS-REFERENCE TO RELATED APPLICATIONS

The present invention is based on and claims priority to Japanese patent application No. JP 2004-193777, filed on Jun. 30, 2004, in the Japanese Patent Office, the entire contents of which are hereby incorporated by reference.

FIELD OF THE INVENTION

The following disclosure relates to correcting image distortion, and more particularly to correcting image distortion caused by scanning.

DESCRIPTION OF THE RELATED ART

When a book document, such as a book or a booklet having a bound boundary or spine, is placed on an exposure glass of a scanner, the book boundary or spine often raises above the surface of the exposure glass. As a result, a scanned image having distortion in a portion corresponding to the book boundary or spine may be generated.

In light of the above, U.S. patent application Ser. No. 10/227,743 ("'743 patent application"), filed on Aug. 26, 2003, the entire contents of which are hereby incorporated by reference, corrects image distortion using a set of indexes including a page outline, a rule line, and a character line. However, the disclosed method leaves some issues to be resolved.

For example, as illustrated in FIGS. 1A and 1B, distortion in the sub-scanning direction is corrected based on the aspect ratio, that is, the ratio of the width to the length, of a minimal circumscribing rectangle formed around each character. If the aspect ratio is substantially equal to 1 as illustrated in FIG. 1A, the distortion in the sub-scanning direction X may be corrected with high accuracy. However, if the aspect ratio is larger or smaller than 1 as illustrated in FIG. 1B, correction accuracy may be lowered.

Further, to properly form a minimal circumscribing rectangle for each character, it is expected that characters are sufficiently separated from each other as illustrated in FIG. 2A. If characters are located closely to one another in the sub-scanning direction X as illustrated in FIG. 2B, a minimal circumscribing rectangle may not be properly formed.

Furthermore, the minimal circumscribing rectangles are used as a basis for determining a character line. If characters are located closely to one another in the main scanning direction Y as illustrated in FIG. 3, a character line may not be properly determined. In the exemplary case shown in FIG. 3, only one character line may be extracted as opposed to three character lines.

BRIEF SUMMARY OF THE INVENTION

Exemplary embodiments of the present invention provide an apparatus, system, method, computer program and product, each capable of correcting distortion in a scanned image in a suitable manner, even when a character having an aspect ratio larger or smaller than one is extracted.

Another exemplary embodiment of the present invention provides an apparatus, system, method, computer program and product, each capable of extracting a character line in a suitable manner from a scanned image, even when characters are located closely to one another in the sub-scanning direction.

Another exemplary embodiment of the present invention provides an apparatus, system, method, computer program and product, each capable of extracting a character line in a suitable manner from a scanned image, even when characters are located closely to one another in the main scanning direction.

Another exemplary embodiment of the present invention provides an apparatus, system, method, computer program and product, each capable of correcting distortion in a scanned image in a suitable manner, even when a character having a relatively small size is extracted.

In this disclosure, example characters include any kind of character, any kind of numerals, and any kind of symbols.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6 is a block diagram illustrating basic components of the scanner of FIG. 4;

FIG. 7 is a block diagram illustrating basic components of an image processor shown in FIG. 6;

DETAILED DESCRIPTION OF THE INVENTION

Figure 1A:
FIG. 1A is an illustration for explaining formation of a minimal circumscribing rectangle having the aspect ratio of about 1.
Figure 1B:
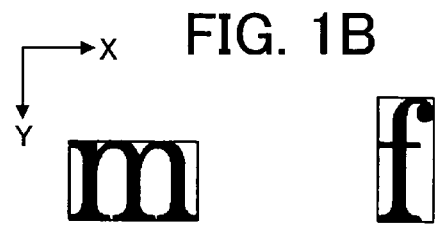
FIG. 1B is an illustration for explaining formation of a minimal circumscribing rectangle having the aspect ratio of larger or smaller than 1.
Figure 2A:
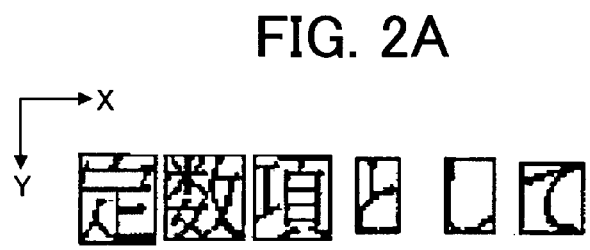
FIG. 2A is an illustration for explaining formation of a minimal circumscribing rectangle when characters are sufficiently separated from each other.
Figure 2B:
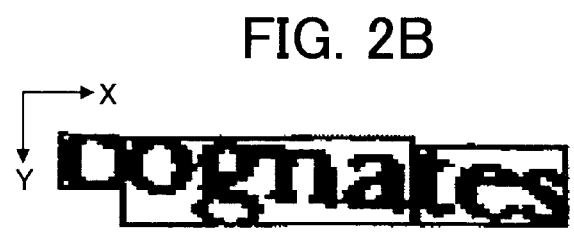
FIG. 2B is an illustration for explaining formation of a minimal circumscribing rectangle when characters are located closely to one another in the sub-scanning direction.
Figure 3:
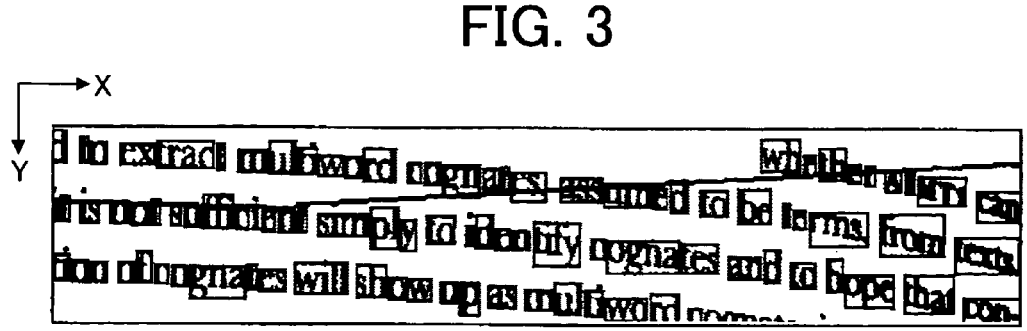
FIG. 3 is an illustration for explaining determination of a character line when characters are located closely to one another in the main scanning direction.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, FIG. 4 illustrates a scanner 1 according to an exemplary embodiment of the present invention.

Figure 4:
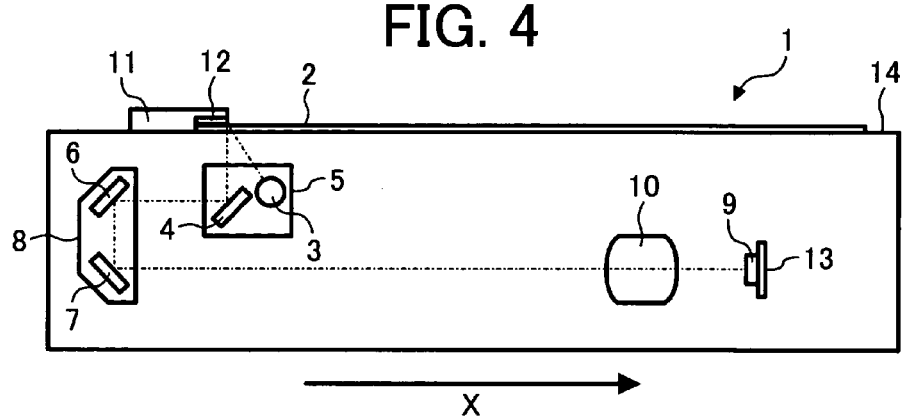
FIG. 4 is a diagram illustrating a cross sectional view of a scanner according to an exemplary embodiment of the present invention.
Figure 5:
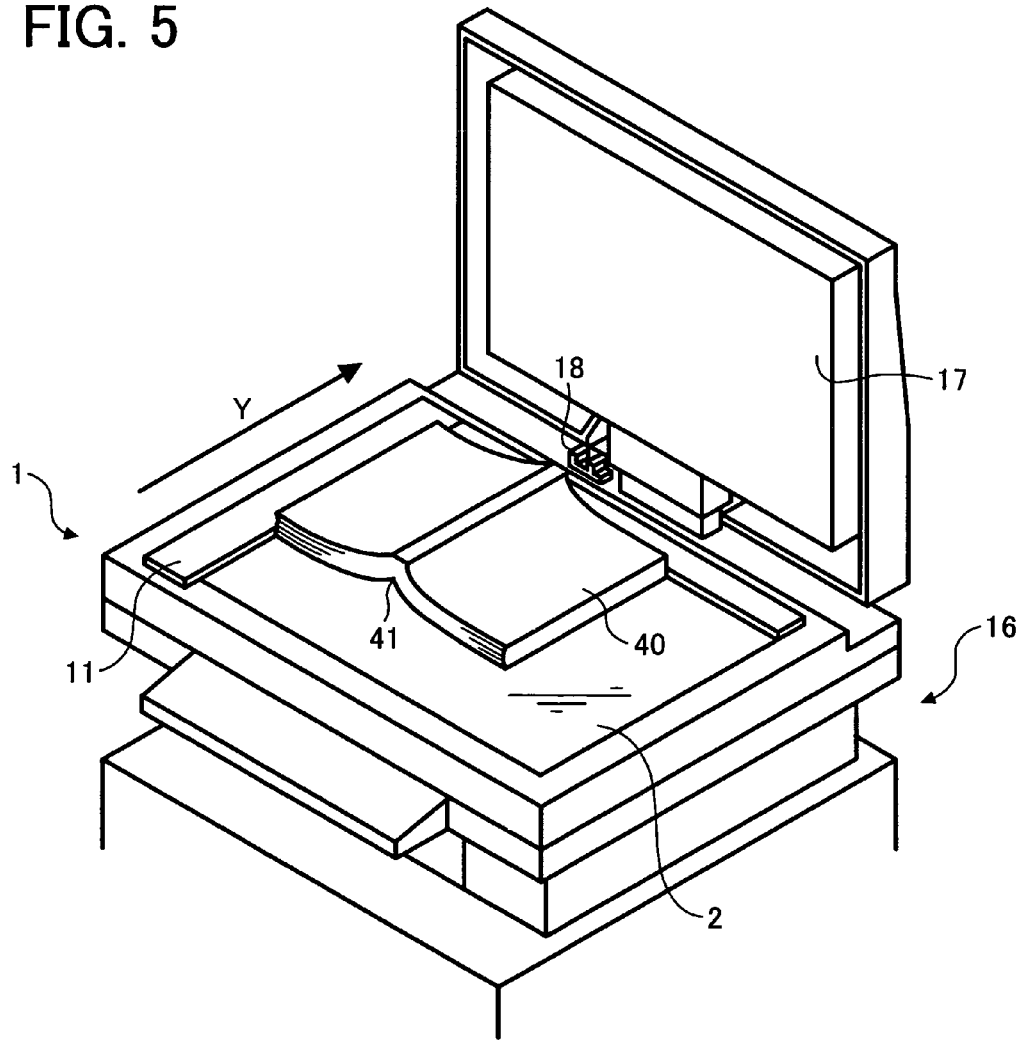
FIG. 5 is a diagram illustrating a perspective view of an upper portion of an image forming apparatus, with a book document placed thereon, according to an exemplary embodiment of the present invention.

The scanner 1 of FIG. 4 is capable of correcting image distortion of an original. As shown in FIG. 5, if a book document 40 having a bound boundary or spine 41 (referred to as the "bound boundary 41") is scanned by the scanner 1, image distortion caused by scanning the bound boundary 41 may be corrected using the scanner 1.

As shown in FIG. 4, the scanner 1 includes an exposure glass 2, a first scanning body 5 having an exposing lamp 3 and a first reflection mirror 4, a second scanning body 8 having a second reflection mirror 6 and a third reflection mirror 7, a CCD (charged coupled device) 9, a lens 10, an original scale 11, a sensor board 13, and a frame 14.

To scan an original placed on the exposure glass 2, the first scanning body 5 and the second scanning body 8 move under the exposure glass 2, and direct a light emitted from the exposing lamp 3 to a selected portion of the original. The light reflected off the original is further reflected by the first reflection mirror 4, the second reflection mirror 6, and the third reflection mirror 7, toward the lens 10. The lens 10 forms an image on the CCD 9 according to the reflected light. The CCD 9 converts the formed image to image data.

The scanner 1 may be combined with a printer (not shown) to function as an image forming apparatus such as a digital copier 16 illustrated in FIG. 5, for example. A press cover 17 opens or closes over the exposure glass 2. An open/close sensor 18 detects the opening or closing position of the press cover 17. The printer of the digital copier 16 may form a toner image on a recording sheet based on the image data generated by the scanner 1.

FIG. 6 is a block diagram illustrating the basic components of the scanner 1. A main controller 19 controls an entire operation of the scanner 1.

The main controller 19 is connected to an image processor 20, a scanner controller 21, an operational panel 22, and a memory 23. The image processor 20 applies image processing to the image data generated by the CCD 9. The scanner controller 21 controls the first scanning body 5 and the second scanning body 8. The operational panel 22 displays various data including a message from the digital copier 16, or allows a user to input an instruction to the digital copier 16, for example. The memory 23 stores various data, including image data received from the CCD 9, for example. The scanner controller 21 is connected to the exposing lamp 3, a stepping motor 24, an HP (home position) sensor 25, and the open/close sensor 18. The stepping motor 24 drives the first scanning body 5 and the second scanning body 8. The home position sensor 25 detects whether the first scanning body 5 or the second scanning body 8 is at a predetermined home position.

Referring now to FIG. 7, an exemplary structure of the image processor 20 is now explained. The image processor 20 includes an analog video processor 26, a shading corrector 27, an image data processor 28, and an image distortion corrector 29. The analog video processor 26 performs amplification and digital conversion on the image data, which is analog, received from the CCD 9. The shading corrector 27 performs shading correction. The image data processor 28 performs image processing on the digital image data. The image data processor 28 may perform other image processing, including MTF correction, gamma correction and variable sizing, etc. The image distortion corrector 29 corrects distortion in the image data. The digital image data, which has been processed by the image processor 20, is sent to the printer via the main controller 19 for image formation.

Figure 8:
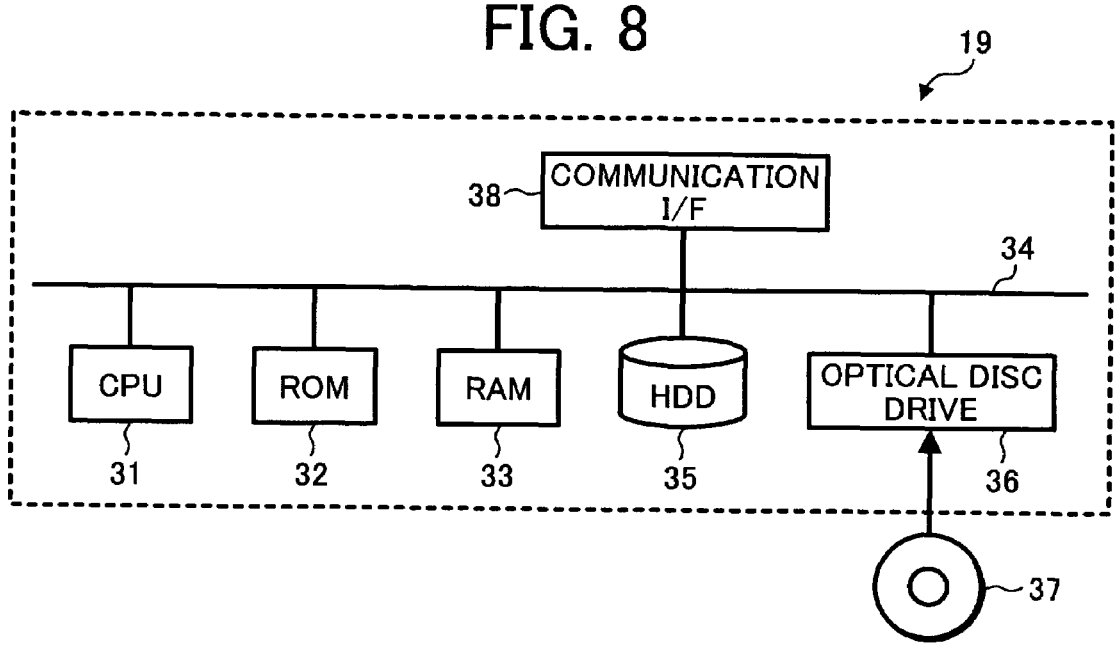
FIG. 8 is a block diagram illustrating basic components of a main controller shown in FIG. 6.

FIG. 8 illustrates an exemplary structure of the main controller 19. The main controller 19 includes a CPU (central processing unit) 31, a ROM (read only memory) 32, a RAM (random access memory) 33, a HDD (hard disk drive) 35, an optical disc drive 36, and a communication I/F (interface) 38, which are connected via a bus 34.

The CPU 31 controls an entire operation of the main controller 19. The ROM 32 stores BIOS (basic input output system) information. The RAM 33 stores various data in an erasable manner to function as a work area. The HDD 35 stores various programs including a control program of the present invention. The optical disc drive 36 reads data from an optical disc 37. The optical disc 37 includes any kind of storage medium, such as CDs, DVDs, or magnetic disks, capable of storing the control program, for example. The communication I/F 38 allows the main controller 19 to communicate with other devices or apparatuses.

According to this exemplary embodiment, the CPU 31, the ROM 32, and the RAM 33 may function as a microprocessor or any other kind of processor capable of correcting image distortion according to the control program of the present invention.

Further, in this exemplary embodiment, any one of the HDD 35, the optical disc drive 36, and the communication I/F 38 may function as a storage device storing the control program of the present invention. In one example, the CPU 31 may read the control program stored in the optical disc 37 using the optical disc drive 36, and install it on the HDD 35. In another example, the CPU 31 may download the control program from a network, such as the Internet, through the communication I/F 38, and install it on the HDD 35. When downloading, a storage device storing the control program functions as a storage medium storing the control program of the present invention.

In this exemplary embodiment, the control program may be operated on a predetermined operating system (OS), or may be included as a part in a group of files implementing an application software program such as a word processing program or the OS.

Figure 9:
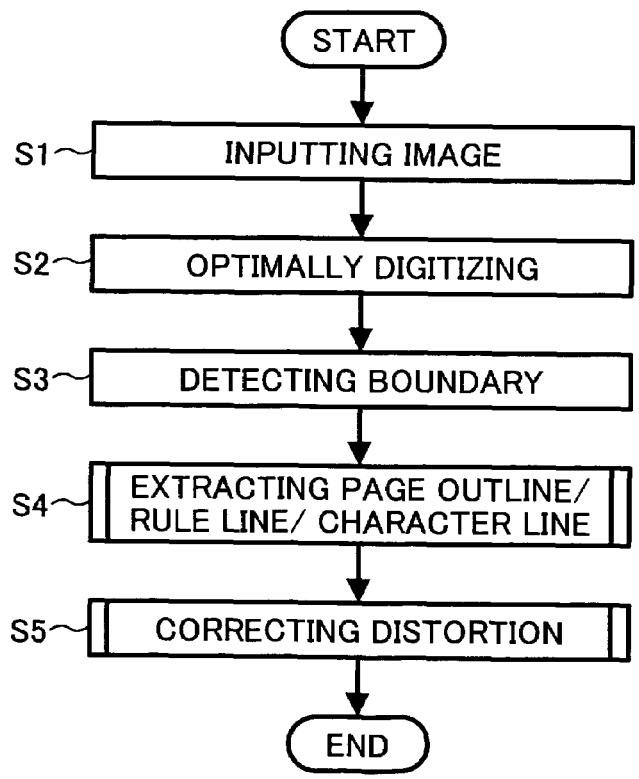
FIG. 9 is a flowchart illustrating image distortion correction, performed by the scanner 1, according to an exemplary embodiment of the present invention.

Referring now to FIG. 9, image distortion correction, performed by the main controller 19, is explained according to an exemplary embodiment of the present invention.

In this exemplary case, it is assumed that the bound boundary 41 of the book document 40 is placed on the exposure glass 2 in parallel to the main scanning direction Y of the scanner 1, as illustrated in FIG. 5. When the operational panel 22 receives an instruction for scanning or copying, for example, the CCD 9 generates image data of the corresponding pages of the book document 40. The image data is then input by the image processor 20 for image processing in Step S1.

Figure 10:
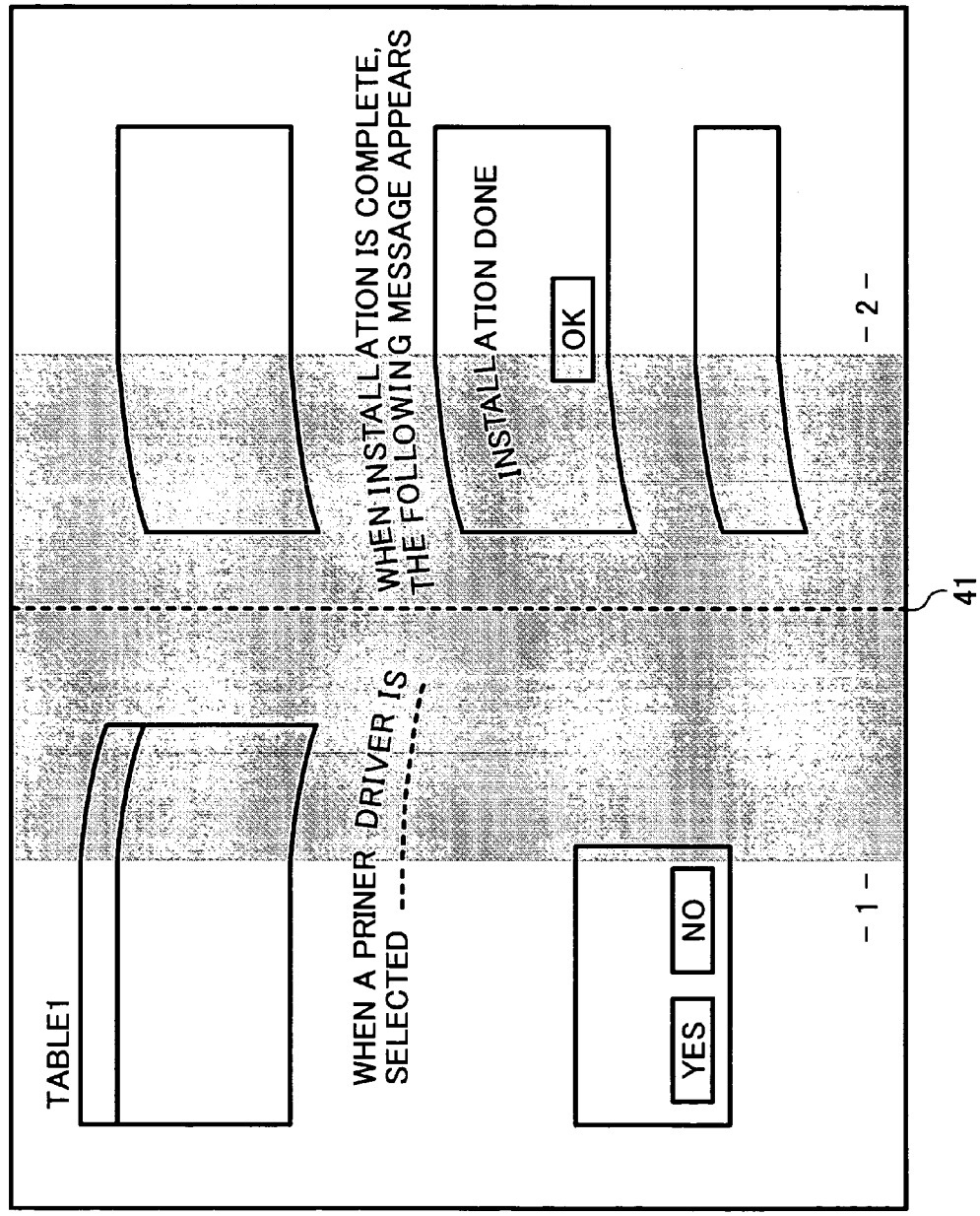
FIG. 10 is an exemplary scanned image having distortion.

The image data may be a binary image or a multivalue image, and may include various types of information. For simplicity, the image data is referred to as the "scanned image" in the following examples. Further, the scanned image is assumed to have distortion near a portion corresponding to the bound boundary 41, as illustrated in FIG. 10. Further, in this exemplary embodiment, two pages are scanned as illustrated in FIG. 10, however, only one page may be scanned at a time.

Step S2 applies optimal digitizing to the scanned image.

Step S3 detects the location in the scanned image corresponding to the bound boundary 41. Specifically, in this exemplary embodiment, Step S3 generates a histogram indicating a number of black pixels located in each location of the sub-scanning direction X. In the case of using the multivalue color image, one of the primitive colors such as red, green or blue may be selected, and a black pixel may be defined based on a predetermined threshold value. Alternatively, the multivalue color image may be converted to a chromatic portion and a luminance portion, and the luminance portion may be used to define black pixels.

Step S4 extracts any one of a page outline, a rule line, and a character line, from the scanned image. The page outline specifies the edges of the scanned image. The rule line specifies arrangement of rule lines. The character line specifies arrangement of characters.

Step S5 corrects distortion in the scanned image caused by the bound boundary 41, using any one of the page outline, the rule line and the character line, extracted in Step S4.

Figures 11, 12A, 12B:
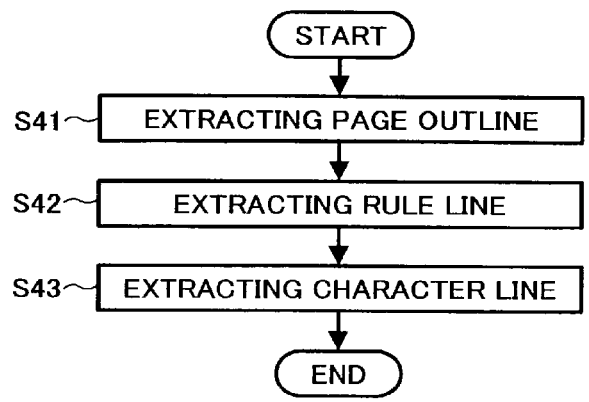
FIG. 11 is a flowchart illustrating further steps involved in the extracting step of FIG. 9.
FIG. 12A is an illustration showing an exemplary situation where characters are oriented horizontally.
FIG. 12B is an illustration for explaining formation of a circumscribed rectangle for each of the characters of FIG. 12A.

Referring now to FIG. 11, the Step S4 extracting processing is explained according to an exemplary embodiment of the present invention.

Step S41 extracts a page outline from the scanned image. The scanned image is first divided into right and left sections based on the detected location of the bound boundary 41. The right section of the scanned image corresponds to a section located at one side (in this example, the right side) relative to the bound boundary 41, while the left section of the scanned image corresponds to a section located at the other side (in this example, the left side) relative to the bound boundary 41.

A page outline is then extracted from each of the right and left sections, using the page outline determination function described in the '743 patent application.

If the page outline is extracted, information regarding the page outline, such as its relative location on the scanned image, is stored in the RAM 33. If the page outline is not extracted, information indicating that no page outline has been extracted is stored in the RAM 33. Further, in this step, an inappropriately extracted page outline may be eliminated, for example, such as the page outline located too close to the edge of the scanned image.

Step S42 extracts a rule line from an entire portion or a selected portion of the scanned image, for example, as illustrated in U.S. patent application Ser. No. 11/054,396 ("'396 patent application"), filed on Feb. 10, 2005, the entire contents of which are hereby incorporated by reference. In this step, when a plurality of the rule lines is extracted in the same section, an optimal rule line may be selected, based on one of the rule line selection standards disclosed in the '743 patent application, for example. At the same time, an inappropriately extracted rule line may be eliminated, such as a rule line located too close to the edge of the scanned image, as illustrated in the '743 patent application, for example. Further, an inappropriately combined rule line may be divided, as illustrated in the '396 patent application, for example.

The extracted rule line, preferably the one selected as the optimal rule line, may be further adjusted by a line approximation or a polynomial curve approximation, in a substantially similar manner as described in the '743 patent application.

If the rule line is extracted in the above-described manner, information regarding the rule line, such as its relative location in the scanned image, is stored in the RAM 33. If the rule line is not extracted, information indicating that no rule line has been extracted is stored in the RAM 33.

Referring back to FIG. 11, Step S43 extracts a character line from the scanned image. First, one or more characters arranged in the same line are extracted from the scanned image. It is then determined whether the characters are oriented vertically or horizontally, using the character determination function disclosed in the '743 patent application.

If the characters are oriented horizontally as in the case shown in FIG. 12A, a circumscribed rectangle A1 is formed for each of the characters oriented horizontally as illustrated in FIG. 12B.

To form the circumscribed rectangle, which represents a vertical component of the character, it is first determined whether a black pixel run having a length, in the main scanning direction Y, equal to or larger than a predetermined run length exists. In this exemplary embodiment, the predetermined run length is determined based on an average size of characters ("average character size") in the scanned image. If the black pixel run having the length equal to or larger than the predetermined run length exists, a circumscribed rectangle is formed based on the detected pixel run.

Figure 13:
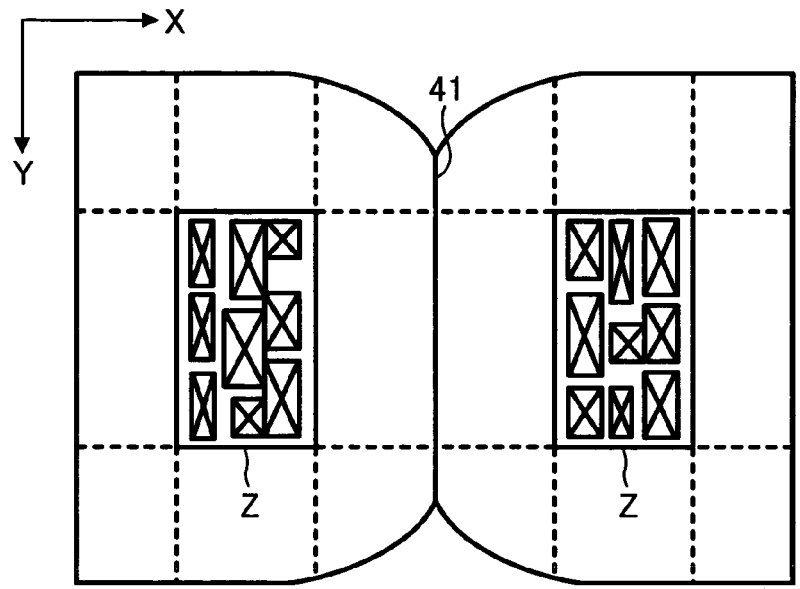
FIG. 13 is a view illustrating exemplary central areas selected from the scanned image of FIG. 10.
Figure 14:
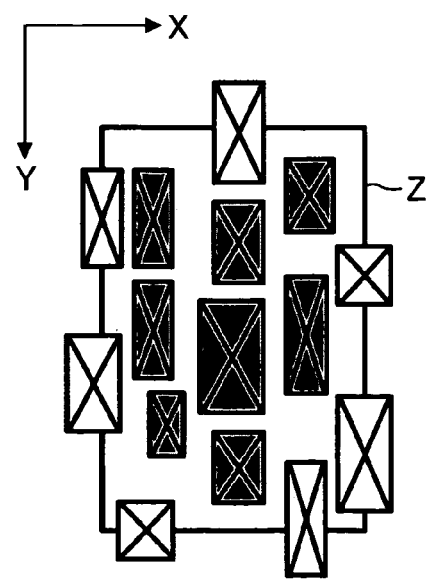
FIG. 14 is a view illustrating exemplary minimal circumscribed rectangles extracted in the central area of FIG. 13.
Figure 15:
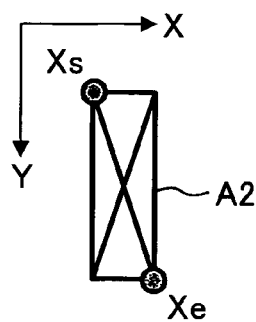
FIG. 15 is an illustration for explaining calculation of a length of a circumscribed rectangle in the main scanning direction according to an exemplary embodiment of the present invention.

Referring now to FIGS. 13 to 15, an exemplary operation of estimating the average character size of the scanned image is now explained.

As shown in FIG. 13, a central area Z is specified for each of the right section and the left section of the scanned image. In this exemplary embodiment, the central area Z is specified such that the length of the central area Z in the main scanning direction Y is 0.5 to 0.75 times of the length of the corresponding section of the scanned image in the main scanning direction Y. However, the length of the central area Z is not limited to such example, as long as the central area Z is included in the undistorted area.

After specifying the central area Z, one or more characters in the central area Z are extracted. In this exemplary embodiment, as shown in FIG. 13, a minimal circumscribed rectangle is formed for each of the characters, which represents horizontal and vertical components of the corresponding character.

Next, it is determined whether any one of the minimal circumscribed rectangles has been inappropriately formed. Examples of inappropriately formed minimal circumscribed rectangles include a minimal circumscribed rectangle having a portion located outside the central area Z, a minimal circumscribed rectangle having a length (in the scanning direction Y or the sub-scanning direction X) that is relatively large, etc. In this exemplary embodiment, the inappropriately formed minimal circumscribed rectangles correspond to the rectangles crossing the outline of the central area Z as indicated by "uncolored rectangles" in FIG. 14. As a result, the colored rectangles in FIG. 14 remain as appropriately formed minimal circumscribed rectangles.

Next, the length in the main scanning direction Y is obtained for each of the appropriately formed minimal circumscribed rectangles. For example, referring to FIG. 15, the length in the main scanning direction Y ("Y length") of the minimal circumscribed rectangle A2 corresponds to the difference between the point Xs and the point Xe. The point Xs corresponds to the Y coordinate where the Y length of the minimal circumscribed rectangle A2 starts, while the point Xe corresponds to the Y coordinate where the Y length of the minimal circumscribed rectangle A2 ends.

Once the Y length is obtained for each of the appropriately formed minimal circumscribed rectangles in each of the right and left sections of the scanned image, the average length Ya of the Y lengths of the minimal circumscribed rectangles can be obtained for each section, by dividing the sum of the Y lengths by the number of the minimal circumscribed rectangles present in each section.

Based on the average length Ya, which represents the average character size of the corresponding section of the scanned image, the predetermined run length to be used for pixel run extraction may be determined as follows.

If the average length Ya, i.e., the average character size, for any one of the right and left sections of the scanned image is 0, the average length Ya having a value other than 0 is used as the predetermined run length.

If the average lengths Ya, i.e., the average character size, for the right and left sections of the scanned image are both 0, a predetermined run length may be set depending on various characteristics of the scanner 1, such as its resolution.

If the average length Ya, i.e., the average character size, for the right and left sections of the scanned image are both positive values (i.e, not 0), the average length Ya having a smaller value is used as the predetermined run length.

In this exemplary embodiment, the average length Ya having the value 0 corresponds to the case where no characters have been extracted in the central area Z.

Further, this exemplary embodiment first forms a minimal circumscribed rectangle for each character, which represents the vertical and horizontal components of the corresponding character. However, a circumscribed rectangle may be firstly formed for each character, which represents the vertical component of the corresponding character. Furthermore, this exemplary embodiment specifies a central area for each of the right and left sections, however, any number of central areas may be specified.

Once the predetermined run length is determined, a pixel run having a length, in the main scanning direction Y, equal to or larger than the predetermined run length is extracted. Based on the extracted run length, a circumscribed rectangle is formed, in a substantially similar manner as described in the '396 patent application.

The length in the main scanning direction Y of the circumscribed rectangle may be further adjusted, when it is determined that the circumscribed rectangles locate closely to each other in the main scanning direction Y, in a substantially similar manner as described in the '396 patent application. Preferably, in this exemplary embodiment, the Y length of the circumscribed rectangle may be reduced, when the Y length is determined to be equal to or larger than a predetermined reduced length, which is previously determined based on the average character size obtained in the above process.

For example, the predetermined reduced length may be obtained by the following equation:

Predetermined reduced length=(Average character size/5)+Minimum reduced length, where the minimum reduced length is previously determined based on various characteristics of the scanner 1, such as its resolution, for example.

Figure 16:
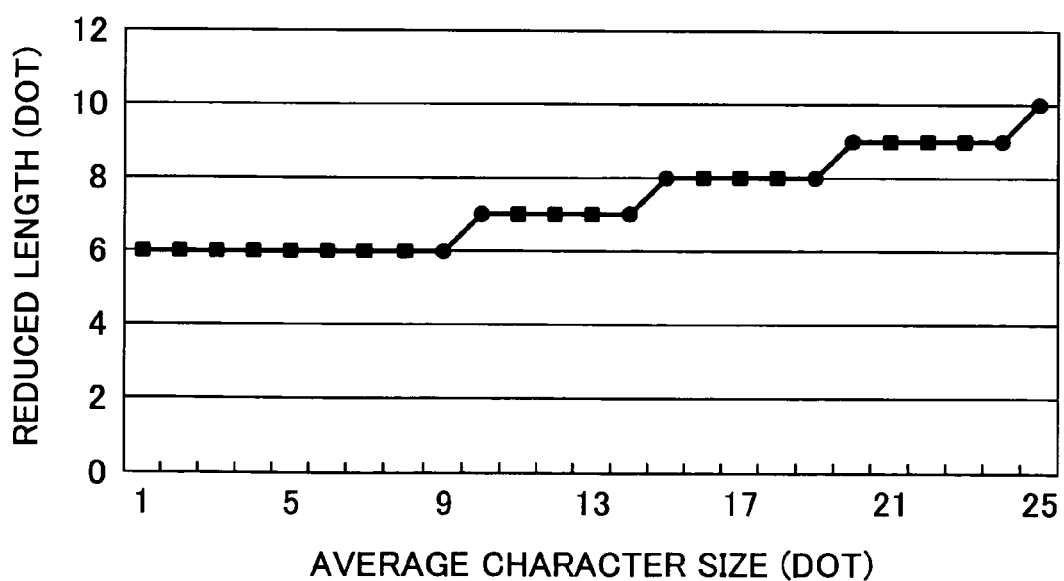
FIG. 16 is a graph showing the relationship between an average character size and a reduced length according to an exemplary embodiment of the present invention.

FIG. 16 illustrates the relationship between the predetermined reduced length and the average character size, when the resolution of the scanner 1 is 200 dpi. As shown in FIG. 16, the predetermined reduced length increases by one dot every time the average character size increases by five dots.

Figure 17A:
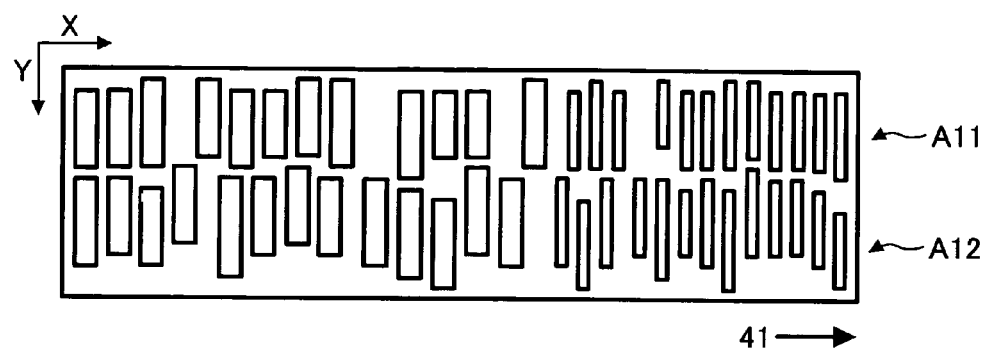
FIG. 17A is an illustration for explaining extraction of a character line, without adjusting a length of a circumscribed rectangle in the main scanning direction.
Figure 17B:
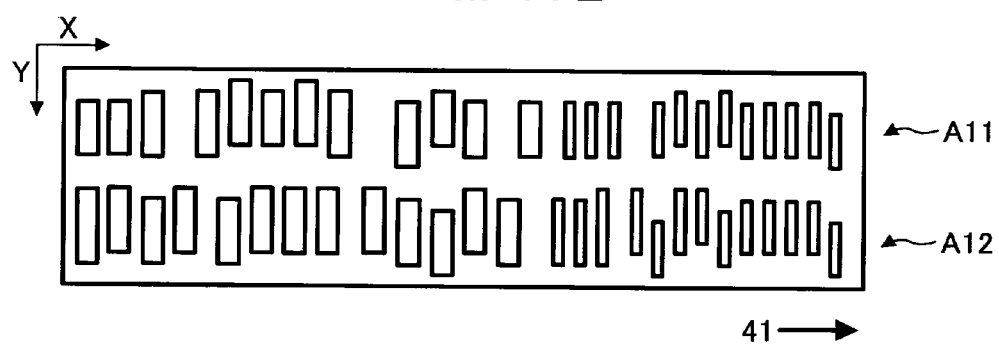
FIG. 17B is an illustration for explaining extraction of a character line, after adjusting a length of a circumscribed rectangle in the main scanning direction.

Now, referring to FIGS. 17A and 17B, an exemplary operation of reducing the Y length of the circumscribed rectangle is explained. The scanned image of FIG. 17A has a first set of circumscribed rectangles A11 arranged at the upper horizontal line and a second set of circumscribed rectangles A12 arranged at the bottom horizontal line. In such a case, only one character line may be formed based on the first and second sets of rectangles A11 and A12, instead of forming two character lines.

To appropriately form two character lines, the length of the circumscribed rectangle may be reduced if the length is determined to be equal to or larger than the predetermined reduced length. As a result, the first and second sets of circumscribed rectangles A11 and A12 can be sufficiently separated from each other, as illustrated in FIG. 17B.

Further, when determining whether the first and second sets of circumscribed rectangles A11 and A12 belong to a single character line or two separate character lines, the distance between the first and second sets of circumscribed rectangles A11 and A12 may be considered.

Figure 17C:
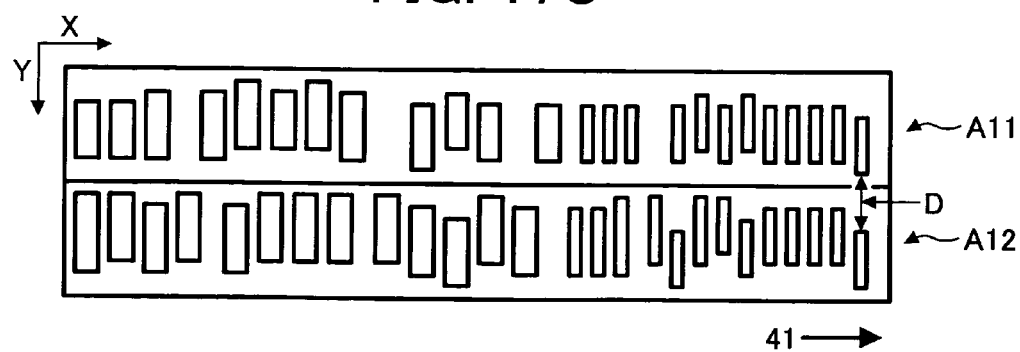
FIG. 17C is an illustration for explaining extraction of a character line, after adjusting a distance of circumscribed rectangles in the main scanning direction.

For example, referring to FIG. 17C, the distance D between the circumscribed rectangle A11 and the corresponding circumscribed rectangle A12 may be compared with a predetermined distance. If the distance D is equal to or larger than the predetermined distance, it is determined that the circumscribed rectangle A11 and the circumscribed rectangle A12 belong to two separate character lines. If the distance D is smaller than the predetermined distance, it is determined that the circumscribed rectangle A11 and the circumscribed rectangle A12 belong to one character line. This process may be repeated for each pair of the circumscribed rectangles A11 and A12. Alternatively, the average distance D may be calculated, which indicates the average distance between the first set of circumscribed rectangles A11 and the second set of circumscribed rectangles A12, and compared with the predetermined distance. In this exemplary embodiment, the predetermined distance may be previously determined based on the average character size obtained in the above process.

When a plurality of character lines are extracted in the same section of the scanned image, an optimal character line may be selected for distortion correction, using one of the character line selection standards disclosed in the '743 patent application. For example, the optimal character line may be selected based on whether it has a longer length, whether it is closer to the bound boundary 41, or whether it is closer to the edge of the scanned image.

Figure 18:
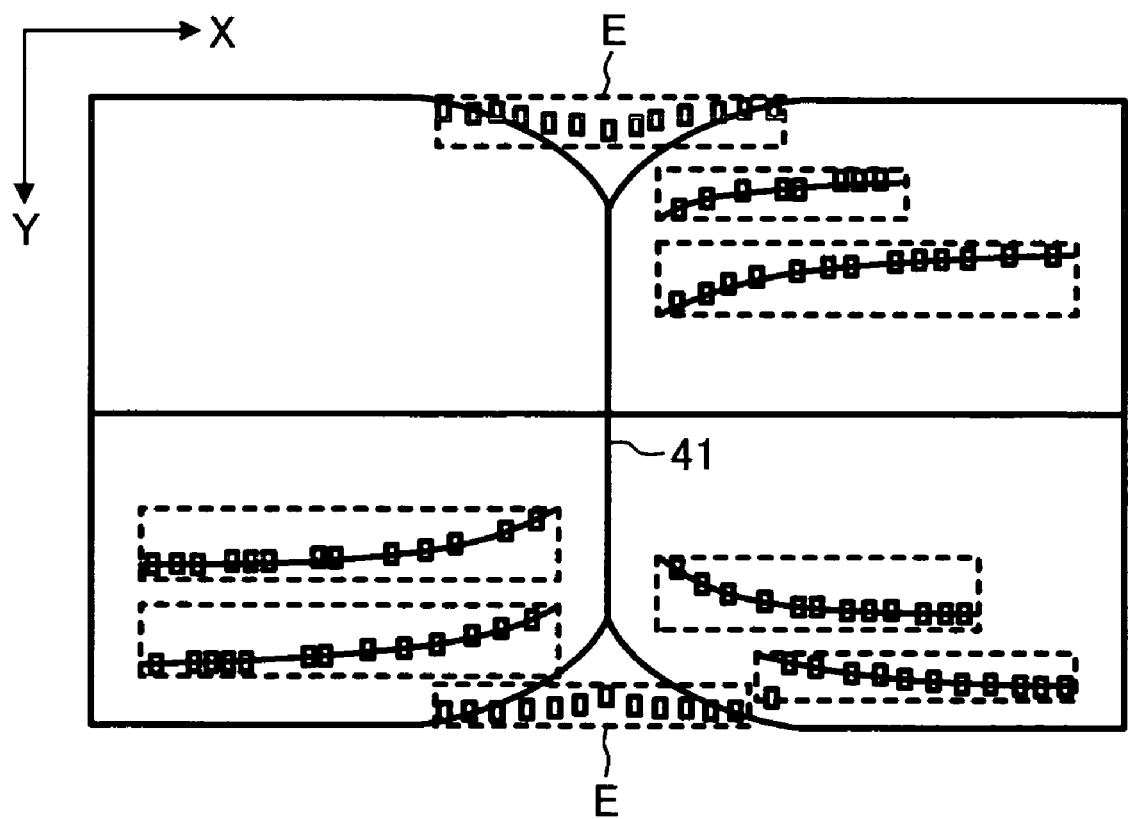
FIG. 18 is a view illustrating exemplary inappropriately extracted character lines according to an exemplary embodiment of the present invention.

At the same time, an inappropriately extracted character line may be eliminated, such as a character line having a length shorter than a predetermined length, a character line crossing over the bound boundary 41, a character line located closely to the edge of the scanned image including the character lines E illustrated in FIG. 18, for example. The other examples of inappropriately extracted character lines are described in the '743 patent application.

The extracted character line, preferably the one selected as the optimal character line, may be further adjusted by a line approximation or a polynomial curve approximation, as described in the '396 patent application, for example.

If the character line is extracted from the characters oriented horizontally in the above-described manner, information regarding the character line, such as its relative location in the scanned image, is temporarily stored in the RAM 33. If the character line is not extracted, information indicating that no character line has been extracted is temporarily stored in the RAM 33.

Referring back to FIG. 11, if Step S43 determines that the characters are oriented vertically, character line extraction may be performed in a substantially similar manner as described in the '396 patent application, for example.

If the character line is extracted from the characters arranged vertically, information regarding the character line, such as its relative location in the scanned image, is temporarily stored in the RAM 33. If the character line is not extracted, information indicating that no character line has been extracted is temporarily stored in the RAM 33.

Steps S41, S42, and S43 of FIG. 11 may be performed in any order, or at least one of Steps S41, S42 and S43 may be performed. For example, if the original includes a binary image, Step S41 may not be performed.

Figure 19:
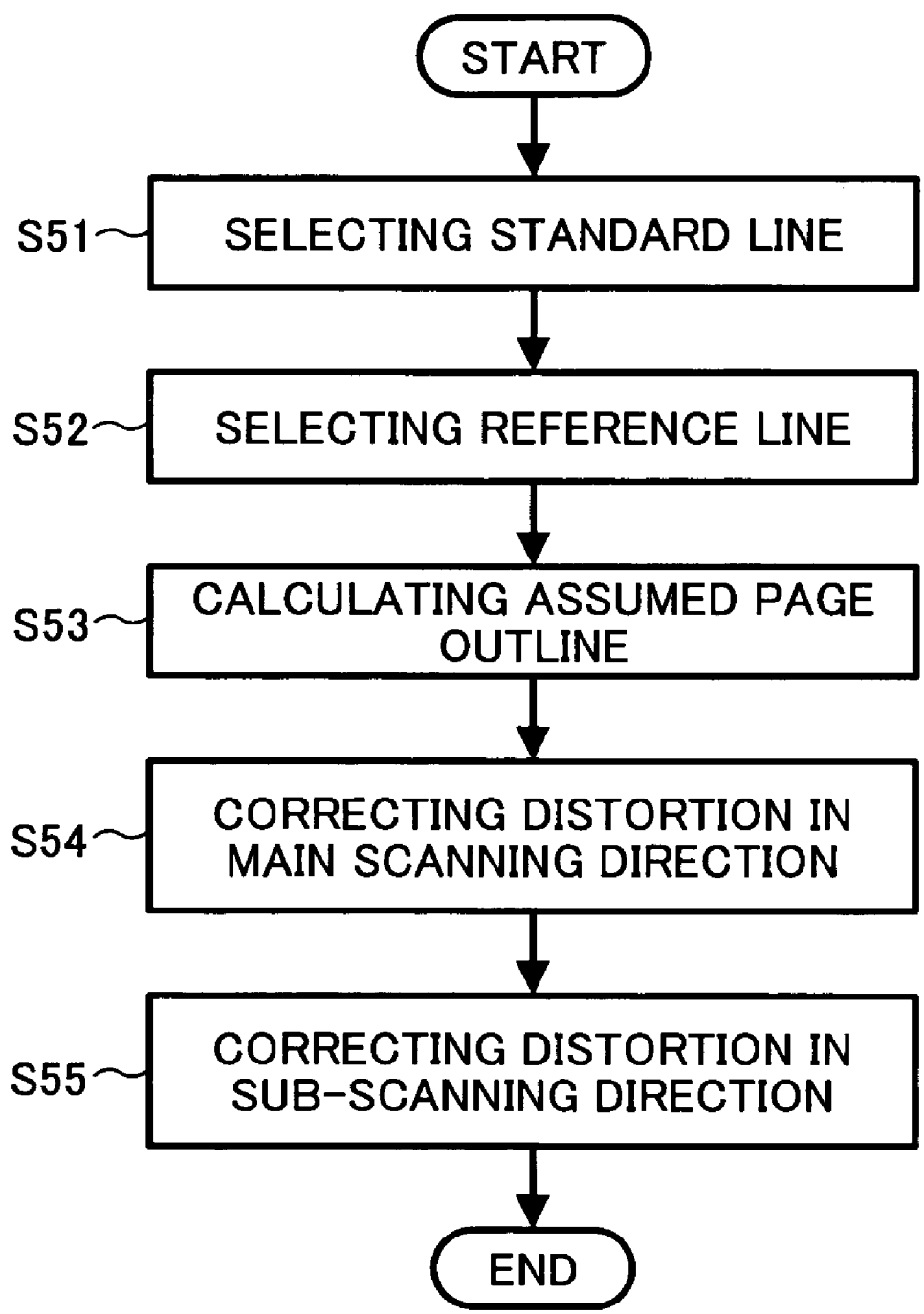
FIG. 19 is a flowchart illustrating further steps involved in the correcting step of FIG. 9.

Referring back to FIG. 9, the Step S5 correcting distortion process is now explained. As shown in FIG. 19, Step S5 includes steps S51 to S55 according to an exemplary embodiment of the present invention.

Step S51 selects a standard line for distortion correction, from the page outline, the rule line, or the character line, extracted in Step S4. Step S52 selects a reference line corresponding to the selected standard line. Step S53 determines an assumed page outline, if the standard line is either a rule line or a character line. Step S54 corrects distortion in the main scanning direction. Step S55 corrects distortion in the sub-scanning direction. The steps S51 to S54 are performed in a substantially similar manner described in the '743 patent application.

Step S55 may be performed in a substantially similar manner as described in the '743 patent application or the '396 patent application, particularly when the parameter of the scanner is unknown.

For example, one or more circumscribed rectangles are extracted from the scanned image. The scanned image is divided into a plurality of short width areas, which has a longitudinal length arranged in parallel to the bound boundary 41 of the scanned image. The average characteristic value of the circumscribed rectangles for each of the short width areas is determined. Based on the average characteristic value, a correction ratio for each of the short width areas is calculated and used to correct the distortion in the sub-scanning direction X.

However, in this exemplary embodiment, the width of the short width area is determined based on the average character size obtained in the above process. Preferably, the width of the short width area is set to be smaller when the small average character size is obtained.

Alternatively, Step S55 may be performed in a substantially similar manner as described in the U.S. Patent Publication No. 2003/0198398, the entire contents of which are hereby incorporated by reference, particularly when the parameter of the scanner 1 is known.

Figure 20:
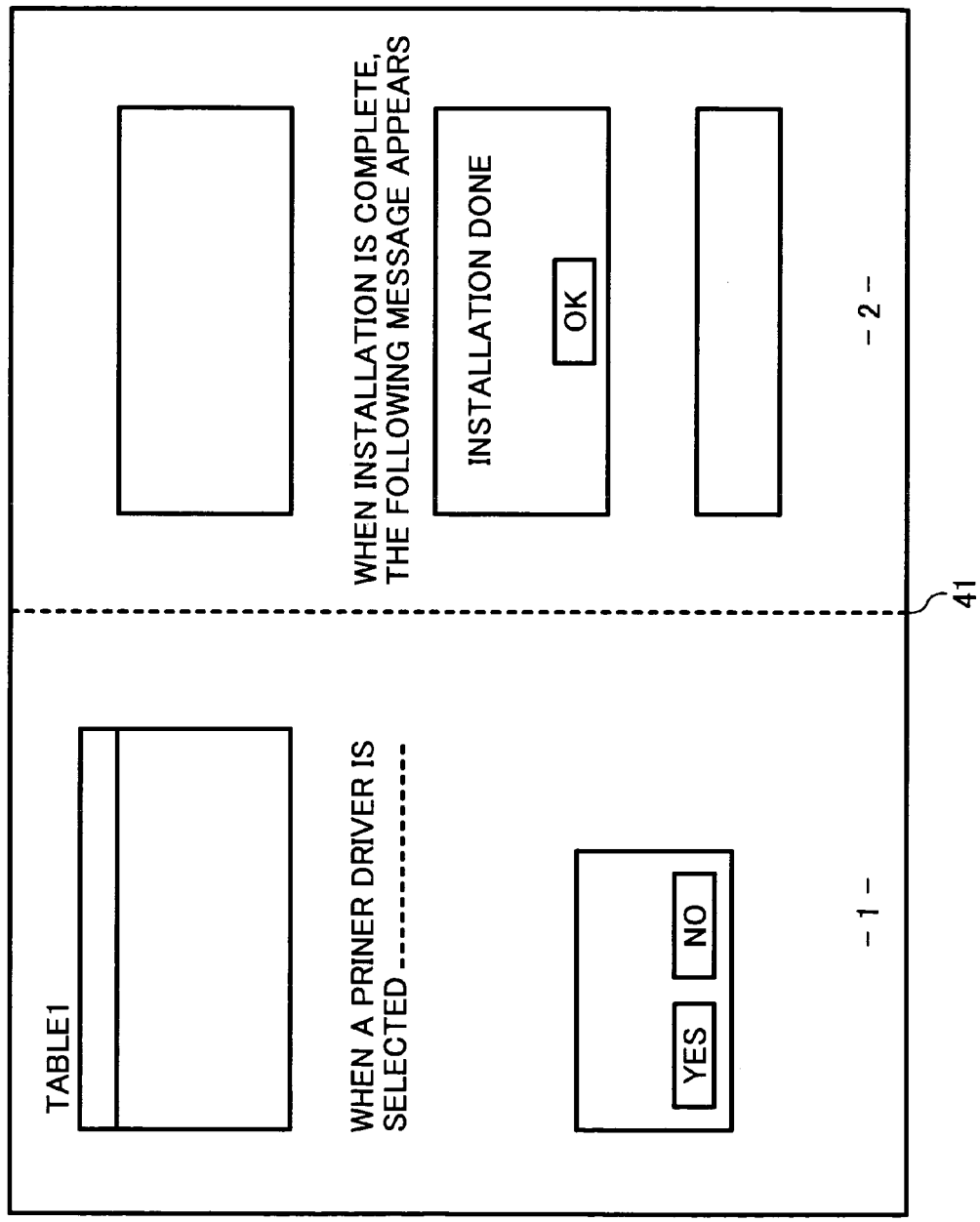
FIG. 20 is the scanned image of FIG. 10, after distortion has been corrected.

After completion of Step S5 of FIG. 9, the distortion in the scanned image of FIG. 10 may be corrected as illustrated in FIG. 20.

Numerous additional modifications and variations are possible in light of the above teachings. It is therefore to be understood that within the scope of the appended claims, the disclosure of this patent specification may be practiced otherwise than as specifically described herein.

For example, the steps illustrated in FIG. 19 may be performed in a different order.

In another example, the scanner 1 may have a structure different from the structure described referring to FIG. 4, as long as it is capable of correcting image distortion. Further, the placement of the book document 40 is not limited to the above-described exemplary case shown in FIG. 5.

Further, the distortion correction function may be performed by a device other than the scanner 1. In one example, the scanner 1 may be connected to a personal computer. The scanner 1 sends image data read from an original to the personal computer. The personal computer loads the program of the present invention, and operates according to the present invention. In another example, the personal computer may perform distortion correction on image data, which has been stored in its storage device or received from the outside.

What is claimed as new and desired to be protected by Letters Patent of the United States is:

1. A computer-implemented method of correcting image distortion, comprising the steps of:

obtaining a scanned image using a scanner, the scanned image having distortion caused by scanning;

estimating an average character size of characters in the scanned image;

determining a run length based on the average character size of the characters;

extracting one or more pixel runs from the scanned image, each of the pixel runs having a run length in a main scanning direction equal to or larger than the determined run length;

forming one or more circumscribed rectangles for the characters based on the extracted and pixel runs;

extracting one or more character lines based on the formed circumscribed rectangles; and correcting the distortion of the scanned image by using the extracted character lines, wherein the estimating step comprises: specifying a central area of the scanned image, where the central area includes a plurality of sections in the scanned image; forming one or more circumscribed rectangles, each of the circumscribed rectangles representing a character from the central area; calculating an average length, which represents an average of lengths in a main scanning direction of the circumscribed rectangles, where the average length is estimated for each one of the plurality of sections; and selecting one of the average lengths having a smallest non-zero value, and using the value of the selected average length as the average character size.

2. The method of claim 1, further comprising the step of:

selecting an optimal character line for the correcting step based on a character line selection standard.

3. The method of claim 1, wherein each of the circumscribed rectangles represents a vertical component of the corresponding character.

4. The method of claim 1, wherein the determined run length is determined based on whether the average character size of the characters is smaller than a predetermined value.

5. The method of claim 1, wherein the forming step further comprises the step of: adjusting a length of each of the circumscribed rectangles in the main scanning direction, if the length is equal to or larger than a predetermined reduced length.

6. The method of claim 5, wherein the predetermined reduced length is determined based on the average character size.

7. The method of claim 1, wherein, when the one or more character lines includes a first character line and a second character line that are adjacent with each other, the first character line and the second character line each including one or more circumscribed rectangles, the extracting step further comprises the step of:
determining a number of the character lines to be extracted based on whether a distance between the circumscribed rectangles included in the first character line and the circumscribed rectangles included in the second character line in the main scanning direction is equal to or larger than a predetermined distance value.

8. The method of claim 7, wherein the predetermined distance value is determined based on the average character size.

9. The method of claim 1, wherein the correcting step comprises:
dividing the scanned image into a plurality of short width areas, each of the short width areas having a longitudinal length parallel to the main scanning direction;
determining a characteristic value for each of the circumscribed rectangles;
grouping the circumscribed rectangles according to the short width areas, using the characteristic value;
determining an average characteristic value for each of the short width areas;
obtaining a correction ratio for each of the short width areas based on the average characteristic value; and
correcting the distortion in the sub-scanning direction, using the obtained correction ratio.

10. The method of claim 9, wherein a width of the short width area in the sub-scanning direction is determined based on the average character size.

11. The method of claim 1, further comprising:
selecting appropriately formed circumscribed rectangles from the formed circumscribed rectangles of the central area, wherein the selected appropriately formed circumscribed rectangles are used for the calculating step.

12. The method of claim 1, wherein the average length is used as the average character size of the scanned image.

13. The method of claim 1, wherein the estimating step further comprises:
selecting one of the average lengths having a value greater than 0, and using that value of the selected average length as the average character size.

14. The method of claim 1, wherein the estimating step further comprises:
setting a predetermined value to be the average character size if none of the average lengths has a value greater than 0.

15. The method of claim 14, wherein the predetermined value is determined based on at least one resolution of the scanned image.

16. A computer-implemented method of correcting image distortion, comprising:
obtaining a scanned image using a scanner, the scanned image having distortion caused by scanning;
extracting a page outline from the scanned image;
extracting a rule line from the scanned image;
estimating an average character size of characters in the scanned image;
determining a run length based on the average character size of the characters;
extracting one or more pixel runs from the scanned image, each of the pixel runs having a run length in a main scanning direction equal to or larger than the determined run length;
forming one or more circumscribed rectangles for the characters;
extracting a character line based on the circumscribed rectangles; and
correcting the distortion in the scanned image by using any one of the extracted page outline, rule line or character line from the scanned image,
wherein the estimating step comprises: specifying a central area of the scanned image, where the central area includes a plurality of sections in the scanned image; forming one or more circumscribed rectangles, each of the circumscribed rectangles representing a character from the central area; calculating an average length, which represents an average of lengths in a main scanning direction of the circumscribed rectangles, where the average length is estimated for each one of the plurality of sections; and selecting one of the average lengths having a smallest non-zero value, and using the value of the selected average length as the average character size.

17. The method of claim 16, further comprising:
printing the corrected scanned image.

18. An image distortion correction apparatus, comprising:
a scanner configured to scan an original into a scanned image;
an image data processor configured to: estimate an average character size of characters in the scanned image; determine a run length based on the average character size of the characters; extract one or more pixel runs from the scanned image, each of the pixel runs having a run length in a main scanning direction equal to or larger than the determined run length; form one or more circumscribed rectangles for the characters based on the extracted pixel runs; and extract one or more character lines based on the formed circumscribed rectangles; and
an image distortion corrector configured to correct distortion in the scanned image, using a correction ratio obtained from the extracted character lines,
wherein the image data processor, when estimating an average character size of characters, is configured to: specify a central area of the scanned image, where the central area includes a plurality of sections in the scanned image; form one or more circumscribed rectangles, each of the circumscribed rectangles representing a character from the central area; calculate an average length, which represents an average of lengths in a main scanning direction of the circumscribed rectangles, where the average length is estimated for each one of the plurality of sections; and select one of the average lengths having a smallest non-zero value, and use the value of the selected average length as the average character size.

19. The image distortion correction apparatus of claim 18, wherein the image data processor is configured to further determine a number of character lines associated with the formed circumscribed rectangles based on the average character size.

20. The image distortion correction apparatus of claim 18, wherein the correction ratio is determined based on the average character size.

21. An image distortion correction apparatus, comprising:
means for obtaining a scanned image having distortion caused by scanning;
means for estimating an average character size of characters in the scanned image;
means for determining a run length based on the average character size of the characters;
means for extracting one or more pixel runs from the scanned image, each of the pixel runs having a run length in a main scanning direction equal to or larger than the determined run length;
means for forming one or more circumscribed rectangles for the characters based on the extracted pixel runs;
extracting one or more character lines based on the formed circumscribed rectangles; and
correcting the distortion of the scanned image by using the character lines, wherein the means for estimating comprises: means for specifying a central area of the scanned image, where the central area includes a plurality of sections in the scanned image; means for forming one or more circumscribed rectangles, each of the circumscribed rectangles representing a character from the central area; means for calculating an average length, which represents an average of lengths in a main scanning direction of the circumscribed rectangles, where the average length is estimated for each one of the plurality of sections; and means for selecting one of the average lengths having a smallest non-zero value, and using the value of the selected average length as the average character size.

22. A system for correcting image distortion, comprising:
a processor;
a storage device configured to store instructions, which when activated by the processor, cause the processor to: obtain a scanned image using a scanner, the scanned image having distortion caused by scanning; estimate an average character size of characters in the scanned image; determine a run length based on the average character size of the characters; extract one or more pixel runs from the scanned image, each of the pixel runs having a run length in a main scanning direction equal to or larger than the determined run length; form one or more circumscribed rectangles for the characters based on the extracted pixel runs; extract one or more character lines based on the formed circumscribed rectangles; and correct the distortion of the scanned image by using the character lines,
wherein the processor estimates the average characterize size of characters by: specifying a central area of the scanned image, where the central area includes a plurality of sections in the scanned image; forming one or more circumscribed rectangles, each of the circumscribed rectangles representing a character from the central area; calculating an average length, which represents an average of lengths in a main scanning direction of the circumscribed rectangles, where the average length is estimated for each one of the plurality of sections; and selecting one of the average lengths having a smallest non-zero value, and using the value of the selected average length as the average character size.

23. A computer program stored on a computer storage medium that, when executed on a computer, causes the computer to perform a method of correcting distortion, the method comprising the steps of:
obtaining a scanned image using a scanner, the scanned image having distortion caused by scanning;
estimating an average character size of characters in the scanned image;
determining a run length based on the average character size of the characters;
extracting one or more pixel runs from the scanned image, each of the pixel runs having a run length in a main scanning direction equal to or larger than the determined run length;
forming one or more circumscribed rectangles for the characters based on the extracted pixel runs;
extracting one or more character lines based on the formed circumscribed rectangles; and
correcting the distortion of the scanned image by using the extracted character lines,
wherein the estimating step comprises: specifying a central area of the scanned image, where the central area includes a plurality of sections in the scanned image; forming one or more circumscribed rectangles, each of the circumscribed rectangles representing a character from the central area; calculating an average length, which represents an average of lengths in a main scanning direction of the circumscribed rectangles, where the average length is estimated for each one of the plurality of sections; and selecting one of the average lengths having a smallest non-zero value, and using the value of the selected average length as the average character size.

24. A computer program stored on a computer storage medium that, when executed on a computer, causes the computer to perform a method of correcting distortion, the method comprising the steps of:
obtaining a scanned image using a scanner, the scanned image having distortion caused by scanning;
extracting a page outline from the scanned image;
extracting a rule line from the scanned image;
estimating an average character size of characters in the scanned image;
determining a run length based on the average character size of the characters;
extracting one or more pixel runs from the scanned image, each of the pixel runs having a run length in a main scanning direction equal to or larger than the determined run length;
forming one or more circumscribed rectangles for the characters;
extracting a character line based on the circumscribed rectangle; and
correcting the distortion in the scanned image by using any one of the extracted page outline, rule line or character line from the scanned image,
wherein the estimating step comprises: specifying a central area of the scanned image, where the central area includes a plurality of sections in the scanned image; forming one or more circumscribed rectangles, each of the circumscribed rectangles representing a character from the central area; calculating an average length, which represents an average of lengths in a main scanning direction of the circumscribed rectangles, where the average length is estimated for each one of the plurality of sections; and selecting one of the average lengths having a smallest non-zero value, and using the value of the selected average length as the average character size.

25. A computer readable medium storing computer instructions for performing a method of correcting distortion, the method comprising the steps of:

obtaining a scanned image using a scanner, the scanned image having distortion caused by scanning;

estimating an average character size of characters in the scanned image;

determining a run length based on the average character size of the characters;

extracting one or more pixel runs from the scanned image, each of the pixel runs having a run length in a main scanning direction equal to or larger than the determined run length;

forming one or more circumscribed rectangles for the characters based on the extracted pixel runs;

extracting one or more character lines based on the formed circumscribed rectangles; and correcting the distortion of the scanned image by using the extracted character lines, wherein the estimating step comprises: specifying a central area of the scanned image, where the central area includes a plurality of sections in the scanned image; forming one or more circumscribed rectangles, each of the circumscribed rectangles representing a character from the central area; calculating an average length, which represents an average of lengths in a main scanning direction of the circumscribed rectangles, where the average length is estimated for each one of the plurality of sections; and selecting one of the average lengths having a smallest non-zero value, and using the value of the selected average length as the average character size.

26. A computer readable medium storing computer instructions for performing a method of correcting distortion, the method comprising the steps of:

obtaining a scanned image using a scanner, the scanned image having a distortion caused by scanning;

extracting a page outline from the scanned image;

extracting a rule line from the scanned image;

estimating an average character size of characters in the scanned image;

determining a run length based on the average character size of the characters;

extracting one or more pixel runs from the scanned image, each of the pixel runs having a run length in a main scanning direction equal to or larger than the determined run length;

forming one or more circumscribed rectangles for the characters;

extracting a character line based on the circumscribed rectangles; and correcting the distortion in the scanned image by using any one of the extracted page outline, rule line or character line from the scanned image, wherein the estimating step comprises: specifying a central area of the scanned image, where the central area includes a plurality of sections in the scanned image; forming one or more circumscribed rectangles, each of the circumscribed rectangles representing a character from the central area; calculating an average length, which represents an average of lengths in a main scanning direction of the circumscribed rectangles, where the average length is estimated for each one of the plurality of sections; and selecting one of the average lengths having a smallest non-zero value, and using the value of the selected average length as the average character size.

* * * * *

UNITED STATES PATENT AND TRADEMARK OFFICE
CERTIFICATE OF CORRECTION

| | |
|---|---|
| PATENT NO. | : 7,630,581 B2 |
| APPLICATION NO. | : 11/168761 |
| DATED | : December 8, 2009 |
| INVENTOR(S) | : Kojima et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1195 days.

Signed and Sealed this

Second Day of November, 2010

David J. Kappos
*Director of the United States Patent and Trademark Office*